US011916318B2

United States Patent

Niman et al.

(10) Patent No.: US 11,916,318 B2
(45) Date of Patent: Feb. 27, 2024

(54) ANTENNA

(71) Applicant: BAE SYSTEMS plc, London (GB)

(72) Inventors: Murray Jerel Niman, Chelmsford (GB); Ashley Lloyd Wade, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 391 days.

(21) Appl. No.: 17/282,041

(22) PCT Filed: Sep. 24, 2019

(86) PCT No.: PCT/GB2019/052681

§ 371 (c)(1),
(2) Date: Apr. 1, 2021

(87) PCT Pub. No.: WO2020/070471

PCT Pub. Date: Apr. 9, 2020

(65) Prior Publication Data

US 2021/0376475 A1 Dec. 2, 2021

(30) Foreign Application Priority Data

Oct. 5, 2018 (EP) .................................... 18275157
Oct. 5, 2018 (GB) .................................... 1816252

(51) Int. Cl.
*H01Q 9/40* (2006.01)
*H01Q 1/38* (2006.01)
*H01Q 1/48* (2006.01)

(52) U.S. Cl.
CPC ................ *H01Q 9/40* (2013.01); *H01Q 1/38* (2013.01); *H01Q 1/48* (2013.01)

(58) Field of Classification Search
CPC ....................... H01Q 1/38–48; H01Q 9/30–40
See application file for complete search history.

(56) References Cited

U.S. PATENT DOCUMENTS 4,370,660 A 1/1983 Fahmy
7,027,002 B2 * 4/2006 Suh .......................... H01Q 9/40 343/773
7,183,978 B1 2/2007 Azar
8,730,118 B1 5/2014 McLean
(Continued)

FOREIGN PATENT DOCUMENTS

CN 101315605 A 12/2008
JP S63252500 A 10/1988
(Continued)

OTHER PUBLICATIONS

International Search Report and Written Opinion received for PCT Application No. PCT/GB2019/052681, dated Oct. 29, 2019. 24 pages.
(Continued)

*Primary Examiner* — Hasan Islam
(74) *Attorney, Agent, or Firm* — Finch & Maloney PLLC

(57) ABSTRACT

Disclosed is an antenna comprising a substantially elliptical element arranged substantially perpendicular to, and spaced apart from, a substantially elliptical ground plane, wherein the substantially elliptical element has a major axis which is substantially perpendicular to the ground plane, and a minor axis which is substantially parallel to the ground plane.

10 Claims, 3 Drawing Sheets

(56) References Cited

U.S. PATENT DOCUMENTS

| | | | | |
|---|---|---|---|---|
| 8,736,506 | B1 * | 5/2014 | Brock | H01Q 9/38<br>343/786 |
| 2003/0076269 | A1 * | 4/2003 | Kuramoto | H01Q 9/36<br>343/702 |
| 2006/0055616 | A1 | 3/2006 | Heyde et al. | |
| 2014/0347243 | A1 * | 11/2014 | Abadi | H01Q 5/364<br>343/860 |

FOREIGN PATENT DOCUMENTS

| | | | |
|---|---|---|---|
| WO | 2004066441 | A1 | 8/2004 |
| WO | 2012027006 | A2 | 3/2012 |
| WO | 2020070471 | A1 | 4/2020 |

OTHER PUBLICATIONS

Search Report under Section 17(5) received for GB Application No. 1816252.9, dated Jan. 23, 2019. 5 pages.

Extended European Search Report received for EP Application No. 18275157.8, dated Apr. 17, 2019. 19 pages.

Agrawall, et al., "Wide-Band Planar Monopole Antennas," IEEE Transactions on Antennas and Propagation, vol. 46, No. 2, Feb. 1998. pp. 294-295.

* cited by examiner

0

ANTENNA

The present invention relates to an antenna. It relates particularly to a wideband antenna having a particular arrangement of primary element and ground plane.

Antennas are essential in Radio Frequency Transmitter, Receivers and Transceivers. There are various forms of antennas, all of which have certain advantages or disadvantages. Much skill is required in the field of antenna design, not least since many of the competing system demands are difficult to reconcile.

In particular, for handheld or portable equipment, such as a mobile telephone or other such device, it is desirable to provide an antenna which provides suitable performance and which is, at the same time, unobtrusive.

Since the earliest mobile telephone devices were provided with an extendable whip antenna, users have demanded internal antennas which provide the same or better performance but which are not liable to inadvertent damage. This has led to the used of PIFA or similar antennas.

A further complication in antenna design is the increasing need to provide antennas which are operable at a suitable performance level across a wide bandwidth. Indeed, the requirement to operate across a large bandwidth has been prompted by developments such as Ultra wideband communications. In this context, Ultra wideband means operable over typically an octave (or more) frequency range.

A problem in the design of such ultra wideband antennas is reconciling different design constraints and still providing an antenna having acceptable performance across the desired range.

Embodiments of the present invention aim to address shortcomings in the prior art, whether mentioned herein or not.

According to the present invention there is provided an apparatus and method as set forth in the appended claims. Other features of the invention will be apparent from the dependent claims, and the description which follows.

According to the present invention there is provided an antenna comprising a substantially elliptical element arranged substantially perpendicular to, and spaced apart from, a substantially elliptical ground plane, wherein the substantially elliptical element has a major axis which is substantially perpendicular to the ground plane, and a minor axis which is substantially parallel to the ground plane.

Suitably, the minor axis of the substantially elliptical element is substantially aligned with a major axis of the ground plane.

Suitably, the major axis of the substantially elliptical element is substantially the same length as the major axis of the elliptical ground plane, and the minor axis of the substantially elliptical element is substantially the same length as a minor axis of the ground plane.

Suitably, the space between the substantially elliptical element and the ground plane is selected so as to achieve a good impedance match between the substantially elliptical element and the ground plane.

Suitably, one or both of the substantially elliptical element and the ground plane is coated with a magneto-dielectric material.

Suitably, the antenna is encapsulated in a material such that the substantially elliptical element and the ground plane are physically shielded.

Suitably, the antenna is encapsulated in a foam material, such as ROHACELL HF.

For a better understanding of the invention, and to show how embodiments of the same may be carried into effect, reference will now be made, by way of example, to the accompanying diagrammatic drawings in which.

Figure 1:
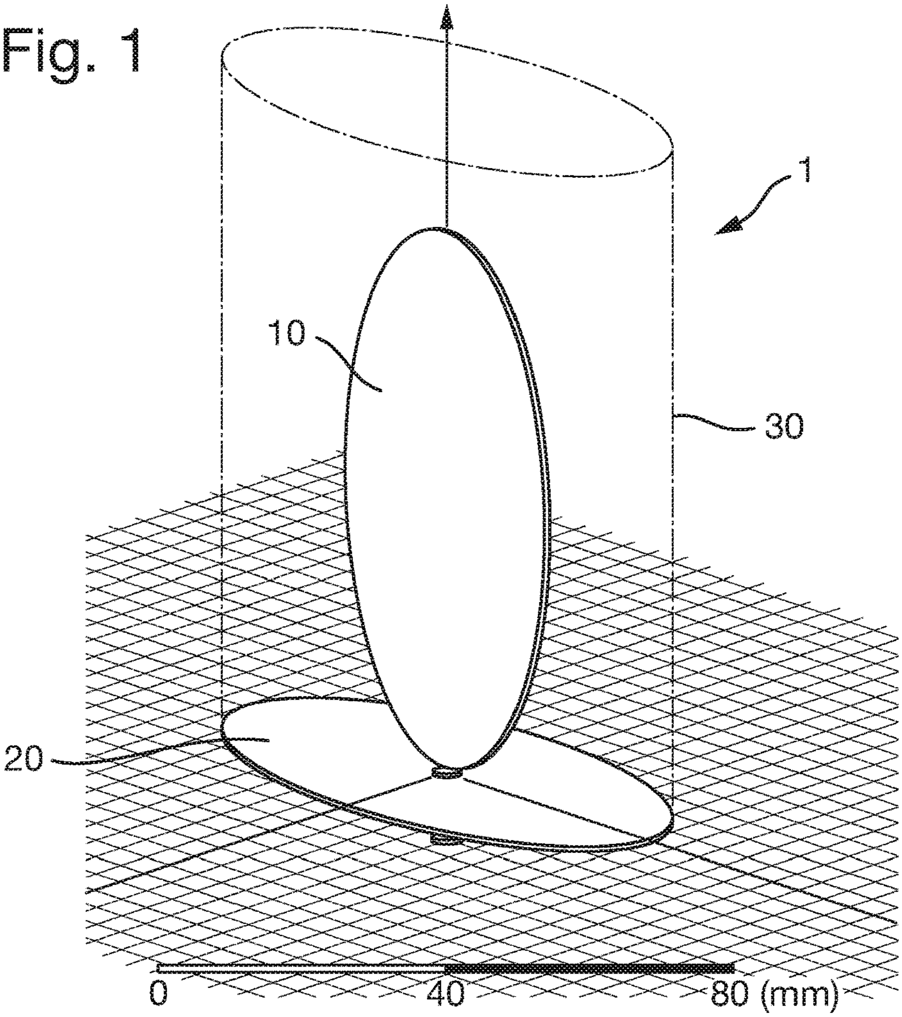
FIG. 1 shows a perspective view of an antenna according to an embodiment of the present invention.
Figure 2:
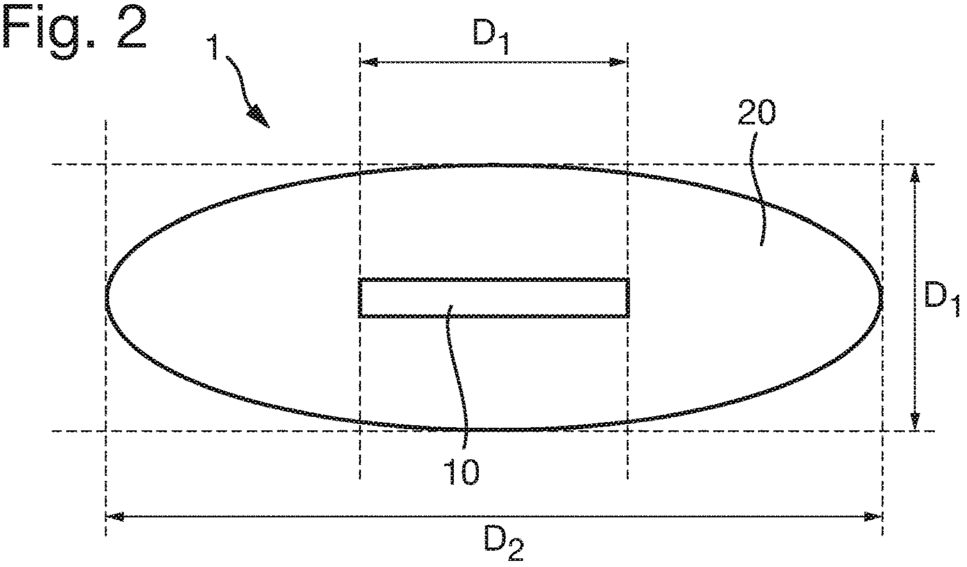
FIG. 2 shows a plan view of an antenna according to an embodiment of the present invention.
Figure 3:
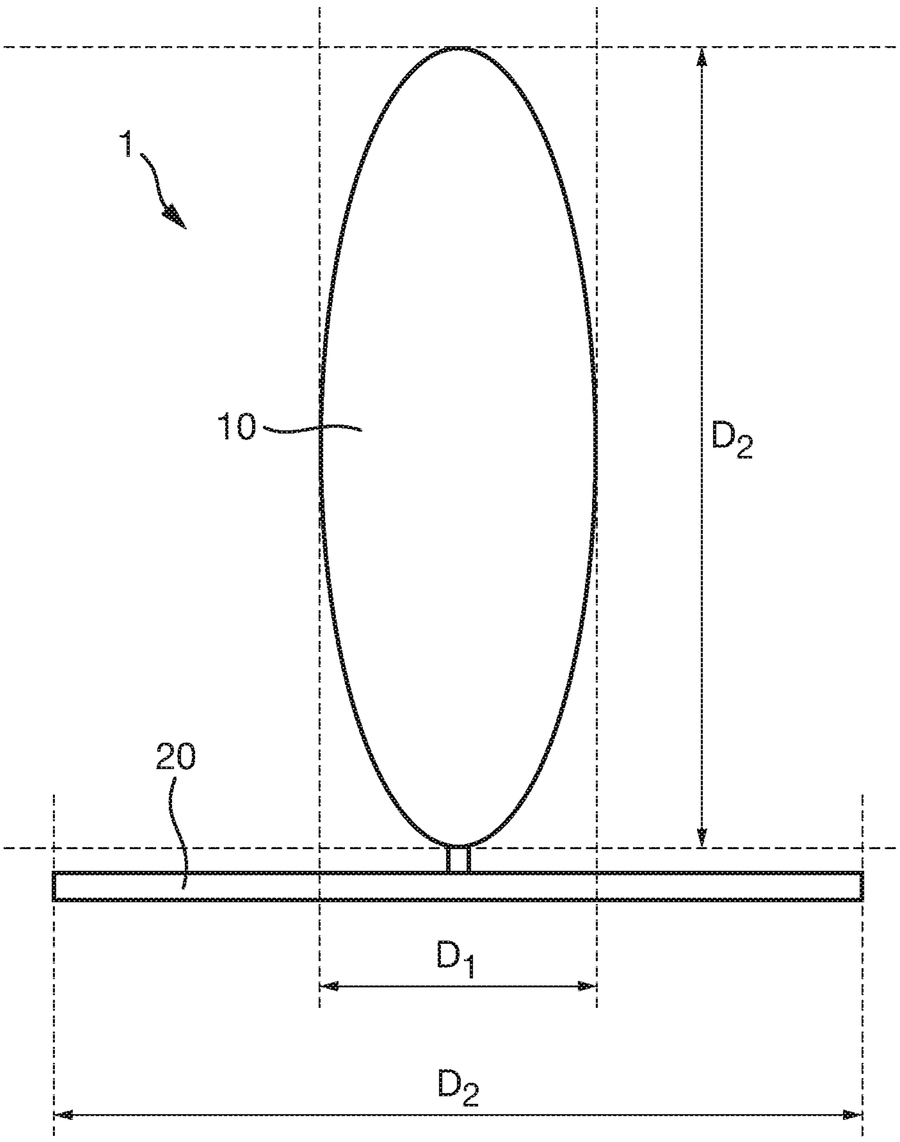
FIG. 3 shows a side view of an antenna according to an embodiment of the present invention.

FIG. 1 shows a perspective view of an antenna 1 according to an embodiment of the present invention. FIGS. 2 and 3 show plan and side views, respectively. As can be seen, the antenna 1 comprises two main parts: a substantially upright and substantially elliptical element 10, mounted in a spaced apart fashion from a substantially elliptical ground plane 20.

In the following description, the term elliptical is used to describe the two parts 10, 20 of the antenna 1. The term elliptical is qualified by the term substantially to mean strict compliance with the mathematical definition of an ellipse is not required. Instead, the term "Substantially elliptical" should be interpreted to mean a generally oval shape. At one extreme, a circle would not fall within the description and at another extreme, a rectangle with rounded corners would not. For brevity and ease of comprehension, whenever the term "elliptical" is used herein, it is not be interpreted as requiring absolute compliance with the mathematical definition and should be interpreted as "substantially elliptical".

In an embodiment, the element 10 is mounted atop a feed structure and is separated from the ground plane 20 by the feed structure. The element 10 is electrically isolated from the ground plane 20 by means of a suitable connector, such as a TNC or SMA connector. In this way, an antenna feed cable can be coupled to the connector from a side of the ground plane opposite to the side above which element 10 is positioned. This separation also provides a degree of impedance matching. The absolute separation distance is determined on a trial and error basis as will be readily understood by the skilled person.

In a preferred embodiment, the size and shape of element 10 and ground plane 20 are identical. As can be seen in FIGS. 2 and 3, there are two dimensions defined for each of the parts 10, 20. Each part has a minor axis $D_1$ and a major axis $D_2$. The major axis $D_2$>minor axis $D_1$.

In another embodiment, the size and shape do not have to match exactly and it is acceptable for $D_1$ and/or $D_2$ to differ by ±20%. It is found that variation of these dimensions in this range delivers an acceptable level of performance.

In a preferred embodiment, the ratio of $D_2$:$D_1$ is 2:1. In other embodiments, this can vary by ±20%. It is found that variation of these dimensions in this range delivers an acceptable level of performance.

Figure 4:
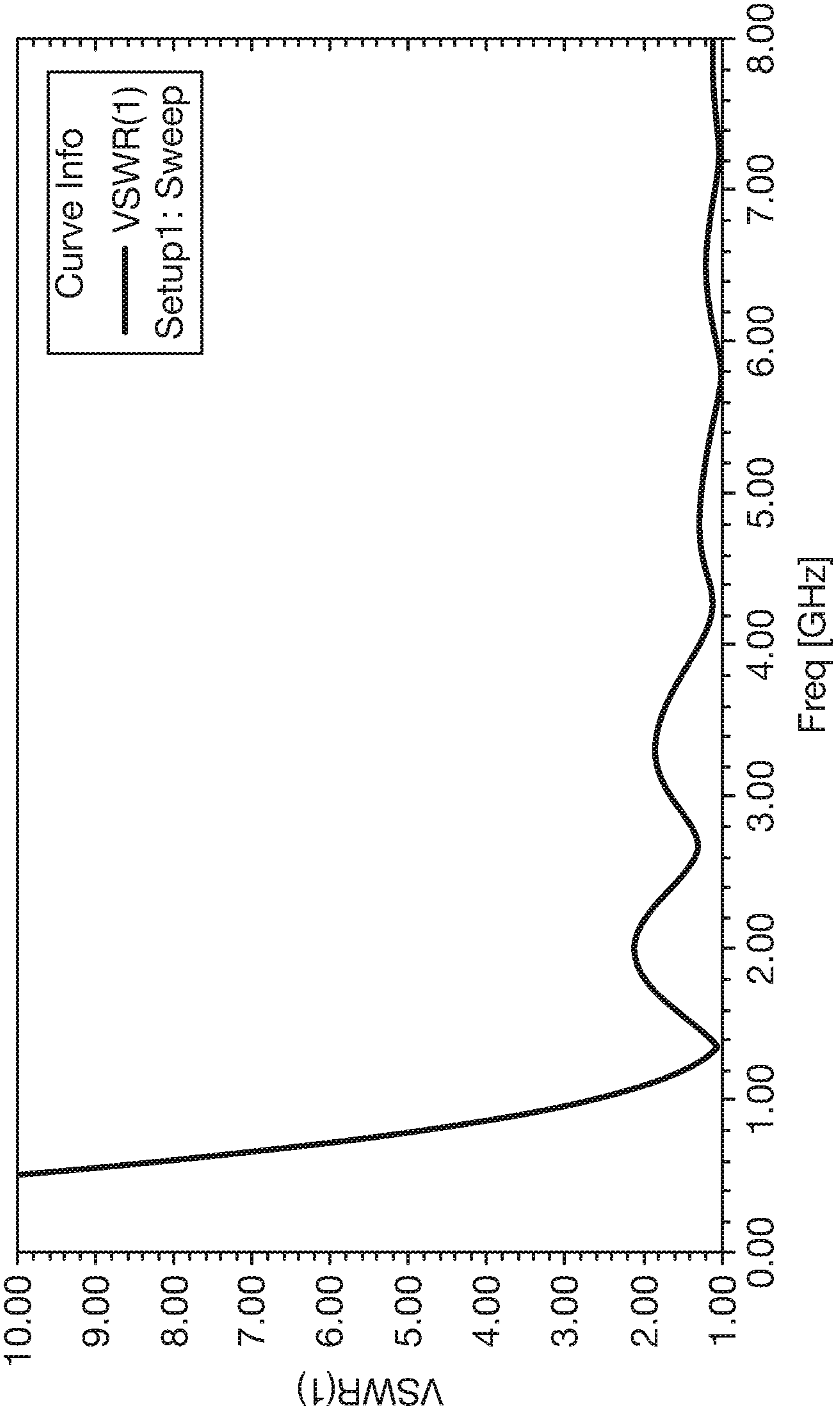
FIG. 4 shows a VSWR plot of an antenna according to an embodiment of the present invention.

In the embodiment shown in FIGS. 1 to 3, D2 is 8 cm and D1 is 4 cm. An antenna having these dimensions is found to operate acceptably well over the frequency range 1 to 6 GHz. This includes many popular frequency bands used in mobile telecommunication, as well as WiFi and other systems. FIG. 4 shows a plot of the VSWR performance of an antenna 1 having these dimensions.

The use of an elliptic shape for a radiating part of an antenna is known, but the combination of an elliptic element 10 and a corresponding elliptical ground plane 20 is new and offers the benefits set out herein.

In use, the relatively wide elliptic surface acts as a mode filter and maintains a stable radiation field without overmodes and notches being introduced at high frequencies, giving a stable omnidirectional radiation pattern.

The ground plane 20 can be formed as a printed component on a circuit board and may be manufactured in a known way, using etching, deposition, milling or any suitable process. The element 10 can be formed as a unitary piece of metal or other conductor and can be formed by a cutting or milling operation. Typically, both ground plane 10 and element 20 are formed from copper. The thickness of each element is not typically critical and can vary from the standard thickness of a printed circuit board trace (e.g. 17 μm, as in 5 oz copper) to a few millimetres, if formed from copper sheet.

The upright element 10 need not be strictly perpendicular to the ground plane 20, but should be substantially normal to it. In use, the element 10 may be mechanically vulnerable unless it can be somehow protected from environmental risks. These risks could include knocks as well as environmental risks from water and the like.

In an embodiment, the entire antenna, except for the connector (not shown) is encapsulated in a foam-like material which protects the antenna and ensures that it remains mechanically sound. In FIG. 1, the foam 30 can be seen surrounding the element 10.

In a further embodiment, the foam-like material has suitable RF characteristics, such that it does not unduly interfere with the operation of the antenna 1. A suitable material is provided by ROHACELL® and is known as ROHACELL HF. This is robust, low density and moisture proof as well as having RF characteristics which do not impede the operation of the antenna. The foam surround 30 can be shaped as required for both practical and aesthetic purposes.

The Ultra wideband performance can be extended to lower frequencies. In the prior art, this would typically be achieved by a significant scaling up of the design or by means of dielectric loading. The former can result in an antenna which is significantly larger and often unsuitable, whereas the latter can lose some bandwidth.

In an embodiment of the present invention, however, it is possible to achieve the benefit of lower frequency operation without substantially altering the dimensions of the antenna by coating the element 10 and ground plane 20 is a magneto-dielectric material (MDM).

In tests conducted on the antenna thus far described, where $D_2$=8 cm and $D_1$=4 cm, a 6 mm coating of both major antenna parts provides acceptable performance well down into VHF bands. The coating is applied to each side of element 10 and the upper side of ground plane 20. This has the benefit of further miniaturising embodiments of the present invention.

A suitable MDM according to an embodiment of the invention is known as Rogers Magtrex 555.

MDMs are able to achieve this performance by having unusually low loss magnetic permeability which combines with conventional dielectric permittivity. They enable antenna size reduction—or conversely lower frequency operation within a size constraint, without the drawbacks associated with traditional dielectric-only loading of poor match to free space impedance, Zo. They achieve this by exploiting the following general relationships:

Overall Impedance:

$$Z = Z_o \cdot \sqrt{\frac{Ur}{Er}}$$

-continued

Benefit: Better matched to free space. Especiallly if $Ur = Er$ – a balanced material – which can thus improve bandwidth Miniaturisation factor $$\lambda = \frac{\lambda_o}{\sqrt{Er \cdot Ur}}$$

Benefit:

Useful miniaturisation factors can be achieved without the use of high $Er$ ceremics etc Where Er=Relative Permittivity (or dielectric Constant)
Ur=Relative Permeability
And both also need to have low loss tangents to avoid loss of efficiency.

Whereas if Ur=1 (leaving Er as in a conventional dielectric) it results in less miniaturisation but poorer impedance matching and bandwidth (especially if high Er is used).

As magneto-dielectric materials are relatively dense, care should be taken to ensure weight constraints are met. In any event, excess thickness of MD may support unwanted rf overmodes or increase losses and should be avoided.

Embodiments of the present invention offer performance across a wide range of frequencies, with the antenna itself being compact and easy to produce.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An antenna comprising:

an elliptical element arranged substantially perpendicular to, and spaced apart from, an elliptical ground plane, wherein the elliptical element has a major axis which is substantially perpendicular to the elliptical ground plane, and a minor axis which is substantially parallel to the elliptical ground plane, wherein the minor axis of the elliptical element is parallel to a major axis of the elliptical ground plane, and wherein a length of the elliptical element along its minor axis is less than a length of the elliptical ground plane along its major axis;

wherein the antenna is encapsulated in a shielding material having RF characteristics that do not impede radiation operation of the antenna.

2. The antenna of claim 1, wherein the elliptical element is physically shielded with a foam.

3. The antenna of claim 2, wherein the major axis of the elliptical element is a same length as the major axis of the elliptical ground plane, and the minor axis of the elliptical element is a same length as a minor axis of the ground plane.

4. The antenna of claim 1, wherein the space between the elliptical element and the ground plane is selected so as to achieve a good impedance match between the elliptical element and the ground plane.

5. The antenna of claim 1, wherein one or both of the elliptical element and the ground plane is coated with a magneto-dielectric material.

6. The antenna of claim 1, wherein the antenna is encapsulated such that the elliptical element and the elliptical ground plane are physically shielded.

7. The antenna of claim 6, wherein the shielding material includes a foam.

8. The antenna of claim 1, wherein the minor axis of the elliptical element is substantially aligned with the major axis of the elliptical ground plane.

9. The antenna of claim 1, wherein a length of the elliptical element along its major axis is within 20% of the length of the elliptical ground plane along its major axis, and the length of the elliptical element along its minor axis is within 20% of a length of the elliptical ground plane along its minor axis.

10. A mobile communication device comprising the antenna of claim 1.

* * * * *